United States Patent
Meier et al.

(10) Patent No.: US 11,954,881 B2
(45) Date of Patent: Apr. 9, 2024

(54) SEMI-SUPERVISED LEARNING USING CLUSTERING AS AN ADDITIONAL CONSTRAINT

(71) Applicant: Apple Inc., Cupertino, CA (US)

(72) Inventors: Peter Meier, Los Gatos, CA (US); Tanmay Batra, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1082 days.

(21) Appl. No.: 16/513,991

(22) Filed: Jul. 17, 2019

(65) Prior Publication Data

US 2020/0074280 A1    Mar. 5, 2020

Related U.S. Application Data

(60) Provisional application No. 62/723,677, filed on Aug. 28, 2018.

(51) Int. Cl.
*G06K 9/62* (2022.01)
*G06F 18/2115* (2023.01)
(Continued)

(52) U.S. Cl.
CPC .......... *G06T 7/73* (2017.01); *G06F 18/2115* (2023.01); *G06F 18/214* (2023.01);
(Continued)

(58) Field of Classification Search
CPC .......... G06K 9/00; G06K 9/62; G06K 9/6217; G06K 9/6218; G06K 9/6222; G06K 9/6223; G06K 9/6255; G06K 9/6256; G06K 9/6261; G06K 9/6262; G06K 9/6264; G06K 9/6269; G06K 9/627; G06K 9/6272; G06N 3/02; G06N 3/04; G06N 3/0445;
(Continued)

(56) References Cited

U.S. PATENT DOCUMENTS 10,679,046 B1 *  6/2020  Black .................. G06V 10/95
10,733,480 B2 *  8/2020  Kumar ................ G06V 10/82
(Continued)

FOREIGN PATENT DOCUMENTS

WO   WO 2016026063   2/2016
WO   WO 2017091833   6/2017
WO   WO 2017168125   10/2017

*Primary Examiner* — Eric Rush
(74) *Attorney, Agent, or Firm* — Thompson Hine LLP

(57) ABSTRACT

In some implementations a neural network is trained to perform a main task using a clustering constraint, for example, using both a main task training loss and a clustering training loss. Training inputs are inputted into a main task neural network to produce output labels predicting locations of the parts of the objects in the training inputs. Data from pooled layers of the main task neural network is inputted into a clustering neural network. The main task neural network and the clustering neural network are trained based on a main task loss from the main task neural network and a clustering loss from the clustering neural network. The main task loss is determined by comparing differences between the output labels and the training labels. The clustering loss encourages the clustering network to learn to label the parts of the objects individually, e.g., to learn groups corresponding to the object parts.

20 Claims, 6 Drawing Sheets

(51) Int. Cl.

| | | |
|---|---|---|
| *G06F 18/214* | (2023.01) | |
| *G06F 18/23213* | (2023.01) | |
| *G06F 18/25* | (2023.01) | |
| *G06N 3/045* | (2023.01) | |
| *G06N 3/084* | (2023.01) | |
| *G06T 7/20* | (2017.01) | |
| *G06T 7/70* | (2017.01) | |
| *G06T 7/73* | (2017.01) | |
| *G06V 10/70* | (2022.01) | |
| *G06V 10/774* | (2022.01) | |
| *G06V 10/82* | (2022.01) | |
| *G06V 40/10* | (2022.01) | |
| *G06V 40/16* | (2022.01) | |
| *G06V 40/20* | (2022.01) | |
| *G10L 15/16* | (2006.01) | |

(52) U.S. Cl.
CPC ...... *G06F 18/23213* (2023.01); *G06F 18/251* (2023.01); *G06N 3/045* (2023.01); *G06N 3/084* (2013.01); *G06T 7/20* (2013.01); *G06T 7/70* (2017.01); *G06V 10/70* (2022.01); *G06V 10/774* (2022.01); *G06V 10/7753* (2022.01); *G06V 10/82* (2022.01); *G06V 40/10* (2022.01); *G06V 40/11* (2022.01); *G06V 40/171* (2022.01); *G06V 40/20* (2022.01); *G10L 15/16* (2013.01); *G06T 2207/20081* (2013.01); *G06T 2207/20084* (2013.01)

(58) Field of Classification Search
CPC ........ G06N 3/0454; G06N 3/08; G06N 3/082; G06N 3/084; G06N 3/088; G06N 20/00; G06N 20/20; G06N 3/045; G06T 7/20; G06T 7/70; G06T 7/73; G06T 2207/20081; G06T 2207/20084; G06T 2207/30196; G06V 10/00; G06V 10/70; G06V 10/762; G06V 10/764; G06V 10/774; G06V 10/7747; G06V 10/7753; G06V 10/778; G06V 10/7792; G06V 10/82; G06V 20/60; G06V 20/62; G06V 20/64; G06V 20/70; G06V 40/10; G06V 40/103; G06V 40/107; G06V 40/11; G06V 40/113; G06V 40/165; G06V 40/171; G06V 40/20; G06V 40/23; G06V 40/25; G06V 40/28; G10L 15/063; G10L 15/16; G06F 18/20; G06F 18/21; G06F 18/2115; G06F 18/213; G06F 18/214; G06F 18/2155; G06F 18/23; G06F 18/232; G06F 18/23211; G06F 18/23213; G06F 18/25; G06F 18/251; G06F 18/253; G06F 18/26; G06F 18/28
USPC ........ 382/100, 155–160, 181, 224–227, 291, 382/292; 700/47, 48; 706/12, 14–16, 18, 706/20–22, 25–28; 704/202, 231, 232, 704/245, 256, 256.1, 256.2, 256.3, 256.4, 704/259

See application file for complete search history.

(56) References Cited

U.S. PATENT DOCUMENTS

| | | | |
|---|---|---|---|
| 11,023,789 B2* | 6/2021 | Kolouri | G06V 10/82 |
| 11,188,794 B2* | 11/2021 | Yao | G06V 10/82 |
| 11,467,300 B2* | 10/2022 | Salman | G06N 3/045 |
| 2016/0148080 A1* | 5/2016 | Yoo | G06V 10/82 |
| | | | 382/118 |
| 2017/0011279 A1 | 1/2017 | Soldevila et al. | |
| 2018/0060722 A1* | 3/2018 | Hwang | G06N 3/0454 |
| 2018/0174047 A1 | 6/2018 | Bourdev et al. | |
| 2018/0336509 A1* | 11/2018 | Guttmann | G06K 9/6262 |
| 2018/0365229 A1* | 12/2018 | Buhrmann | G06N 3/0454 |
| 2018/0365532 A1* | 12/2018 | Molchanov | G06V 10/82 |
| 2019/0073560 A1* | 3/2019 | Matei | G06V 10/82 |
| 2020/0027002 A1* | 1/2020 | Hickson | G06V 10/82 |
| 2020/0349921 A1* | 11/2020 | Jansen | G06N 3/0454 |

* cited by examiner

INITIAL TRAINING USING LABELLED DATA SET

CREATION OF AUTO-LABELLED DATA SET

FURTHER TRAINING USING AUTO-LABELLED DATA SET

Clustering enforces that patterns learnt for the same parts are similar

Spatial patterns of a right hand of all input images should be similar

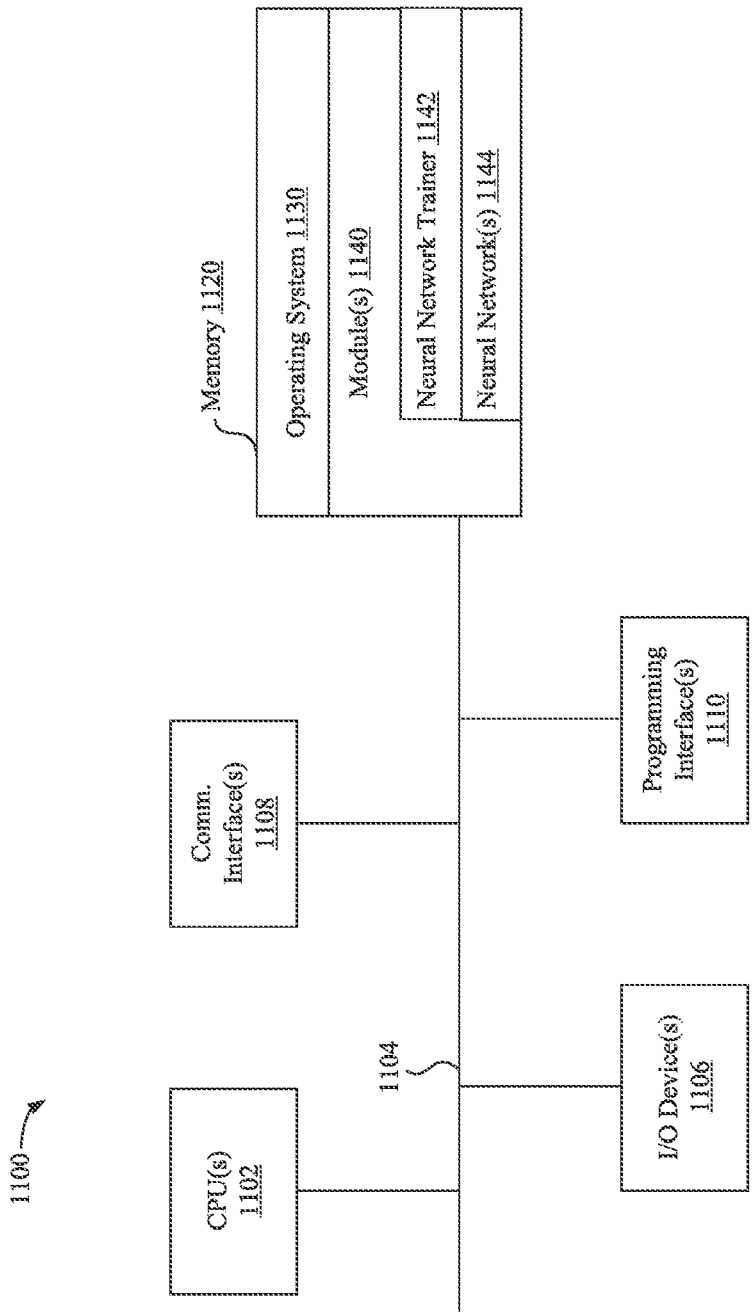

SEMI-SUPERVISED LEARNING USING CLUSTERING AS AN ADDITIONAL CONSTRAINT

CROSS-REFERENCE TO RELATED APPLICATION

This Application claims the benefit of U.S. Provisional Application Ser. No. 62/723,677 filed Aug. 28, 2018, which is incorporated herein in its entirety.

TECHNICAL FIELD

The present disclosure generally relates to neural networks, and in particular, to systems, methods, and devices for neural network learning and implementation.

BACKGROUND

Neural networks can be trained for various operations including, but not limited to, prediction, forecasting, classification, pattern recognition, and general reinforcement learning. Neural networks can be trained using semi-supervised learning. One example of semi-supervised learning is a "bootstrapping" method that starts with a small number of labeled examples, trains an initial neural network using those examples, and then uses the initial neural network to label un-labeled data. The neural network is then trained further using the most confident self-labeled examples. The example of semi-supervised learning falls between unsupervised learning (e.g., without any labeled training data) and supervised learning (e.g., with completely labeled training data).

Semi-supervised learning for neural networks using a small number of labeled examples can be inefficient or lack accuracy. In order to train neural networks using a relatively small number of labeled examples, additional constraints on the neural networks are needed.

SUMMARY

In some implementations, a neural network is trained to perform a main task using a clustering constraint, for example, using both a main task training loss and a clustering training loss. In one such implementation, this involves obtaining a training set of training inputs and corresponding training labels. The training labels identify known (e.g., ground truth) locations of parts of objects in the training inputs. For example, the training labels may identify poses of people (e.g., identifying the various body parts that make up each person's skeletal pose in training input images). The training inputs are inputted into a main task neural network to produce output labels predicting locations of the parts of the objects in the training inputs. Data from pooled layers of the main task neural network are inputted into a clustering neural network. The main task neural network and the clustering neural network are trained based on a main task loss from the main task neural network and a clustering loss from the clustering neural network. The main task loss is determined by comparing the output labels and the training labels. The clustering loss encourages the clustering network to learn to label the parts of the objects individually, e.g., to learn groups corresponding to the parts of the objects.

Training the main task and the clustering neural networks together using both a main task loss and a clustering loss can facilitate a more accurate and efficient training process. The clustering neural network can receive pooled layers of the main task neural network and learn to recognize parts (e.g., parts of an image corresponding to parts of a pose, hand, body, gaze, parts of an audio sample corresponding to words or phrases, parts of text corresponding to words or phrases, or any other parts of data elements that can be individually analyzed). This recognition of parts by the clustering neural network helps ensure that the main task neural network is trained to accurately perform its main task, even given a relatively small initial set of labelled-training data. Training the two neural networks together can ensure that the groups learned by the clustering neural network correspond to the parts, e.g., a group for left arm parts, a group for right arm parts, etc. Training the networks together can additionally encourage similarity between sub-parts of feature maps across multiple images. The clustering ensures that patterns learnt for the same parts are similar, e.g., that the spatial patterns of a right of all input images should be similar. Such training techniques are particularly advantageous in implementations that train using a relatively small set of manually-labelled training data or in implementations in which a main task has multiple parts that are likely to be associated with similar patterns (e.g., similarity between sub-parts of feature maps representing left arms in images of humans).

In some implementations, the clustering-based training technique is part of a semi-supervised, iterative learning process. After the initial clustering-based training using a small training set of images, additional (unlabeled) inputs are input into the main task neural network to produce additional output labels and corresponding confidence values. Based on the confidence values, an automatically-labeled training set of data is automatically selected. This set of data includes a subset of the additional inputs and a corresponding subset of the additional output labels, for example, including a specified number of the additional inputs that correspond to the highest confidence values. The main task neural network is then trained further using the automatically-labeled training set of data.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 11 is a block diagram of an example system architecture of an exemplary device in accordance with some implementations.

Figure 1:
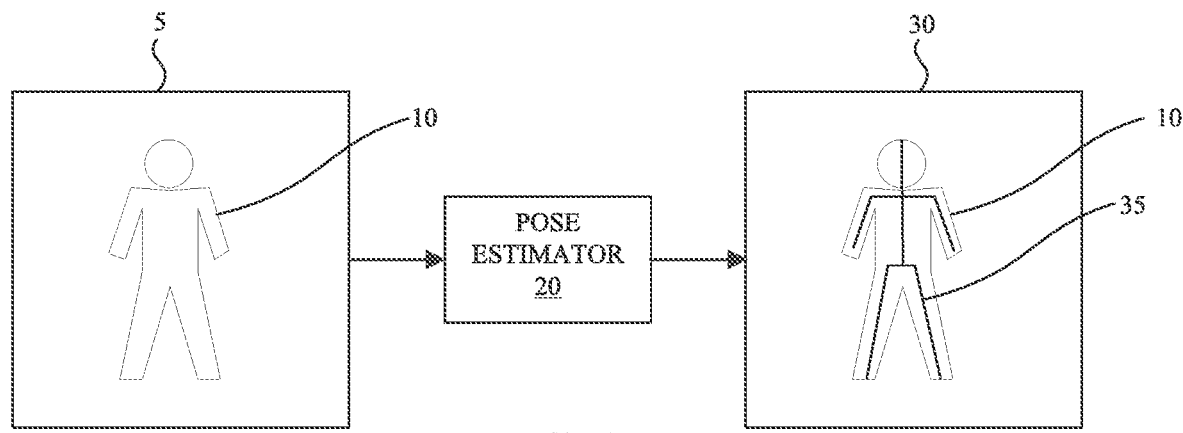
FIG. 1 is a block diagram of an example pose estimator predicting a pose of a human in an image in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Implementations of training based on clustering using the techniques disclosed herein can be adapted to train neural networks for human pose estimation, hand tracking, body tracking, gaze tracking, semantic segmentation, and other applications in which a main task has multiple associated parts. While several of the examples described herein illustrate aspects of various implementations in the context of pose estimation, it should be understood that implementations can additionally or alternatively be used in other scenarios.

FIG. 1 is a block diagram of an example pose estimator 20 predicting a pose 35 of a human 10 in an image 5 in accordance with some implementations. For example, pose estimator 20 may be a neural network trained according to one or more of the training techniques disclosed herein to receive an input image and output a pose 35 (e.g., represented by "bones" of a "skeleton") on the image on output image 30. Given a different input image of the same or a different human in the same or a different pose (e.g., of a human kneeling, sitting down, with arms extended sideways, etc.), the pose estimator 20 will produce an output that includes a pose of the respective human in the respective input image. The pose in this example includes various parts, e.g., left arm, right arm, torso, left leg, right leg, etc.

In some implementations, a set of labelled inputs is used to train the pose estimator 20. The labelled inputs in this example include input images of humans in which the poses of the humans have been identified. The input images may include the same human or different humans in the one or more poses (e.g., sitting, standing, crouching, with arms extended, with one leg out, etc.).

Figure 2:
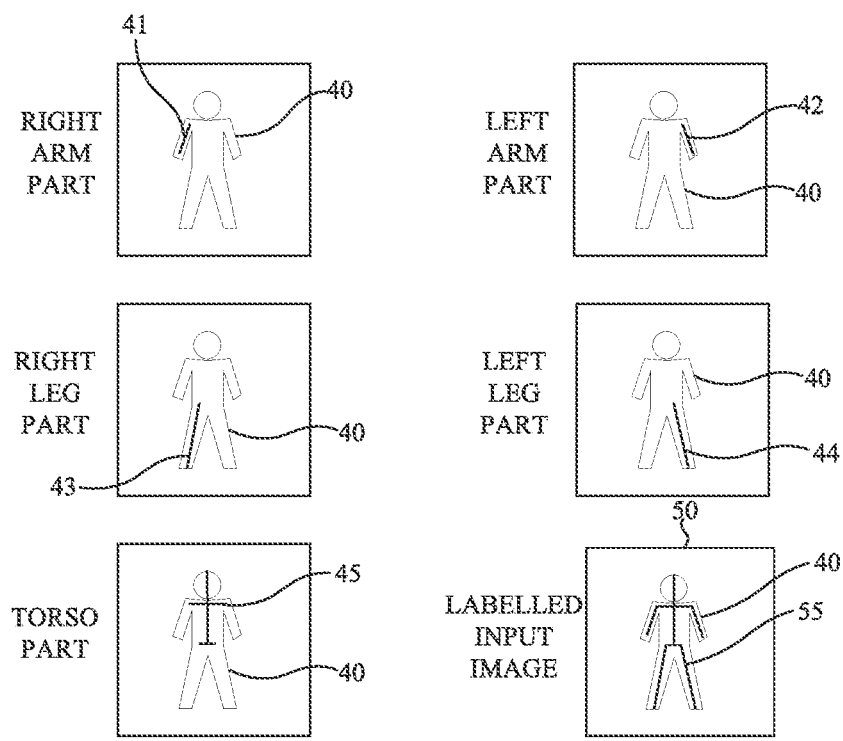
FIG. 2 is a block diagram illustrating the labeling of parts of a pose in accordance with some implementations.

FIG. 2 is a block diagram illustrating the labeling of parts of a pose in accordance with some implementations. Such parts illustrate parts that may be manually labelled in an input image or parts that may be automatically labelled as output of a pose estimator, as examples. In the example of FIG. 2, the pose 55 of a human 40 includes a right arm part 41, a left arm part 42, a right leg part 43, a left leg part 44, and a torso part 45. Collectively these parts 41, 42, 43, 44, 45 are received based on a manual or automatic labelling process. For example, a user interface on a device may present the image 5 and a user may use an input device to draw/position one or more lines represent the right arm part 41, draw/position one or more lines representing the left arm part 42, etc. The user may identify or otherwise label each part. For example, after drawing/positioning a line representing the right arm part, the user may select from a drop down menu of part options selecting a part type (e.g., right arm) from a limited set of predetermined parts associated with a human pose. The user interface may display a label or other distinguishing feature (e.g., different color lines, etc.) identifying the different parts 41, 42, 43, 44, 45 of the pose in the image 5. In an alternative implementation, parts of an image are identified using bounding boxes. For example, a user may provide input producing a bounding box surrounding some or all of the left arm, a bounding box around some or all of the right arm, etc.

Figure 3:
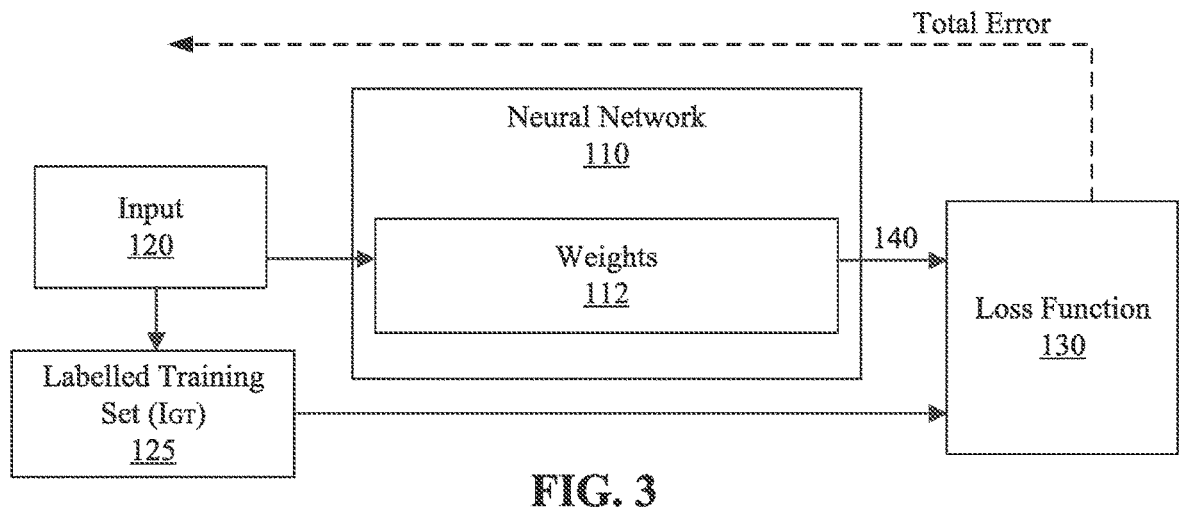
FIG. 3 is a block diagram of an example process for initially training a neural network in accordance with some implementations.
Figure 4:
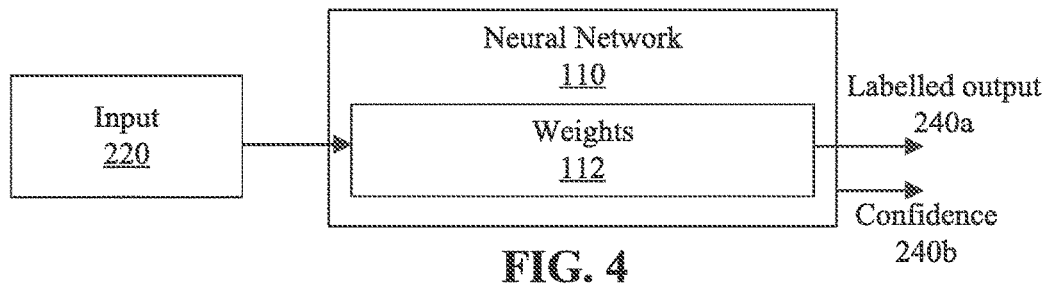
FIG. 4 is a block diagram of an example of creating an automatically-labelled data set using the initially-trained network in accordance with some implementations.
Figure 5:
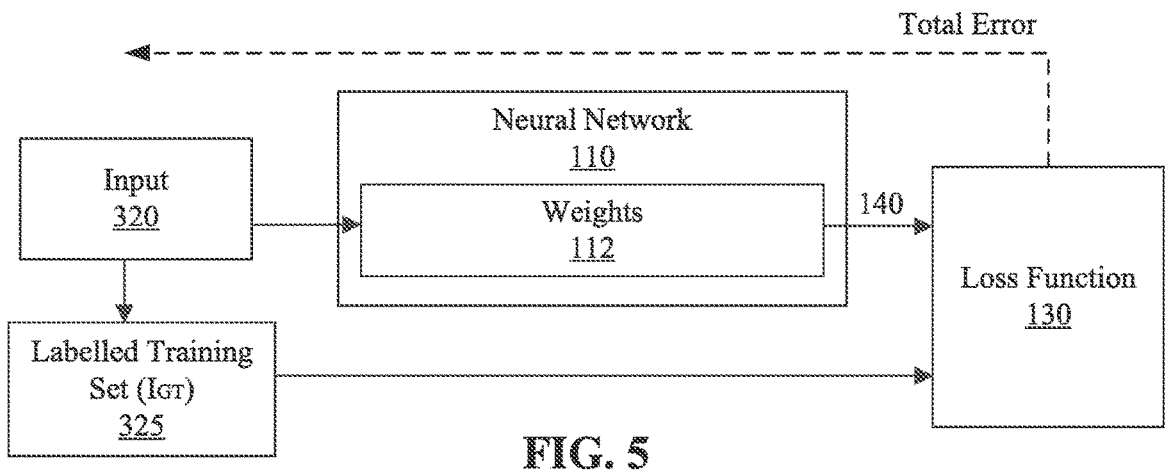
FIG. 5 is a block diagram of an example of further training the neural network using the automatically-labelled data set in accordance with some implementations.

FIGS. 3-5 illustrate a semi-supervised neural network training process that results in a main task neural network 110 that is trained to perform a main task such as pose estimation performed by the pose estimator 20 of FIG. 1. Main tasks can include, but are not limited to, human pose estimation, hand tracking, body tracking, gaze tracking, semantic segmentation, and other applications in which a main task has multiple associated parts. Generally, the semi-supervised neural network training process involves initially training the neural network 110 using a small set of training inputs (e.g., 20 labelled input images), creating an automatically labelled data set to be selectively used as additional inputs for further training, and using some of the automatically-labelled additional inputs (e.g., those having the highest confidence values) as additional inputs to further train the neural network 110.

FIG. 3 is a block diagram of an example process for initially training a neural network 110. In various implementations, the neural network 110 has one or more layers, for example, an input layer, one or more hidden (or inner) layers, and an output layer. Each layer comprises one or more nodes. Training the neural network 110 can involve adjusting values for weights 112 that specify the relationships between the nodes or otherwise connect the nodes. Weights 112 can include weights between the input layer and a hidden layer, weights between more than one hidden layer, and weights between the last hidden layer and the output layer.

In FIG. 3, during a supervised training stage of semi-supervised learning, the weights 112 of the neural network 110 are initialized. The input 120 (e.g., a set of training images) is manually labeled for the identified neural network main task to become a labeled training set 125 (e.g., ground truth labeled inputs ($I_{GT}$)). For example, if the neural network main task is human pose estimation, human shapes or skeletons can be labeled in images of the input 120. A loss function 130 (e.g., error function) is also determined for the identified neural network main task. For example, a loss function 130 could be a distance between joints or a relationship of labeled/identified joints in a skeleton.

The neural network 110 undergoes supervised training using the input 120 and the labelled training set 125, for example, using the loss function 130 and a gradient decent technique. The training can involve modifying the weights 112 to minimize the difference between the actual neural network 110 output 140 and the target output specified by labelled training set 125 (e.g., $I_{GT}$). This difference between the actual output 140 and the target output can be determined by the loss function 130 and provide some or all of the total error used to adjust the weights. In some implementations, the loss function 130 equals the output 140 minus the target output specified by labelled training set 125 (e.g., $I_{GT}$). The output 140 of the neural network 110 can include a labeled output (e.g., labelled image) and a confidence value (e.g., representative of total error for that corresponding output).

In various implementations, gradient descent can use gradient back propagation to adjust the weights 112 to reduce total error, e.g., determined by the loss function 130. Gradient descent for neural network training can include full batch training, stochastic training or mini-batch training. Full batch training sums the gradients for all elements of the training set and then updates the weights 112 of the neural network 110. Stochastic training updates the weights 112 of the neural network 110 after each individual element of the training set. Mini-batch training sums the gradients for multiple training elements (but not all) of the training set and then updates the weights 112 of the neural network 110. For example, mini-batch training can be used to update the weights 112 of the neural network 110 in four steps. As a specific example, the input 120 can include twenty images and the labeled training set $I_{GT}$ 125 can include twenty corresponding labeled images as ground truth data. During training, after the first five images of the input 120 are passed through the neural network 110, the loss function 130 sums the gradients then updates the weights 112 of the neural network 110 working backward from the output layer weights, through the hidden layer weights (e.g., inner layer weights) to the input layer weights to minimize the difference (defined by the loss function 130) between the actual output 140 and the target output specified by labelled training set 125 (e.g., $I_{GT}$). Then, the next five images of the input 120 are passed through the neural network 110 and the weights 112 are updated. This process repeats until all of the inputs 120 are passed through the neural network 110.

FIG. 4 is a diagram that shows a second portion of semi-supervised learning for the example neural network 110. As shown in FIG. 4, input 220 (e.g., a million or a billion unlabeled images) are input into the initially trained neural network 110. The neural network outputs, for each input 220 (e.g., image 1, image 2, . . . image n), a corresponding labeled output 240 (e.g., labelled image 1, labelled image 2, . . . labelled image n) along with its respective confidence value. A subset (e.g., 10, 20, 100, or 1000 items) of the output 240 is identified for further training of the neural network 110. For example, the labelled output images of the output 240 (e.g., the outputs having the highest confidence values) and their associated unlabeled inputs from input 220 can be selected for use as the inputs for further training of the neural network 110 as an automatically-labelled data set. This can involve taking the 100 (or any other number depending upon the confidence values) most confident predicted outputs and their corresponding input images and adding them to the labelled dataset. It should be noted that it is not necessary to use a fixed number (e.g., 100) of outputs. For example, the technique can use all predictions that have a confidence value above a certain threshold (e.g., the technique could select all of the predicted outputs having a confidence value of greater than 80% and their corresponding inputs). In such cases, the actual number of additions may vary, e.g., there may be 1 prediction satisfying the threshold requirement or there may be 1000 predictions satisfying the threshold requirement.

FIG. 5 is a block diagram of an example of further training the neural network 110 using the automatically-labelled data set. In FIG. 5, the neural network 110 is further trained using a process similar to the process described with respect to FIG. 3. The neural network 110 is trained using second training inputs 320 and corresponding second labeled training outputs 325 that include the most confident outputs of the outputs 240 of FIG. 4 and potentially the inputs 120 and outputs 125 (e.g., $I_{GT}$) of FIG. 3. FIG. 5 thus illustrates further training of the neural network 110 using the at least the most confident outputs of the outputs 240 of FIG. 4. The second training portion of the semi-supervised learning for the neural network 110 illustrated in FIGS. 4-5 can be repeated to further train the neural network 110 until an acceptable degree of accuracy is achieved.

In some implementations a neural network, such as neural network 110, is trained to perform a main task using a clustering constraint, for example, using both a main task training loss and a clustering training loss. In some implementations, such training includes both a main task neural network and a clustering network in a single training process.

Figure 6:
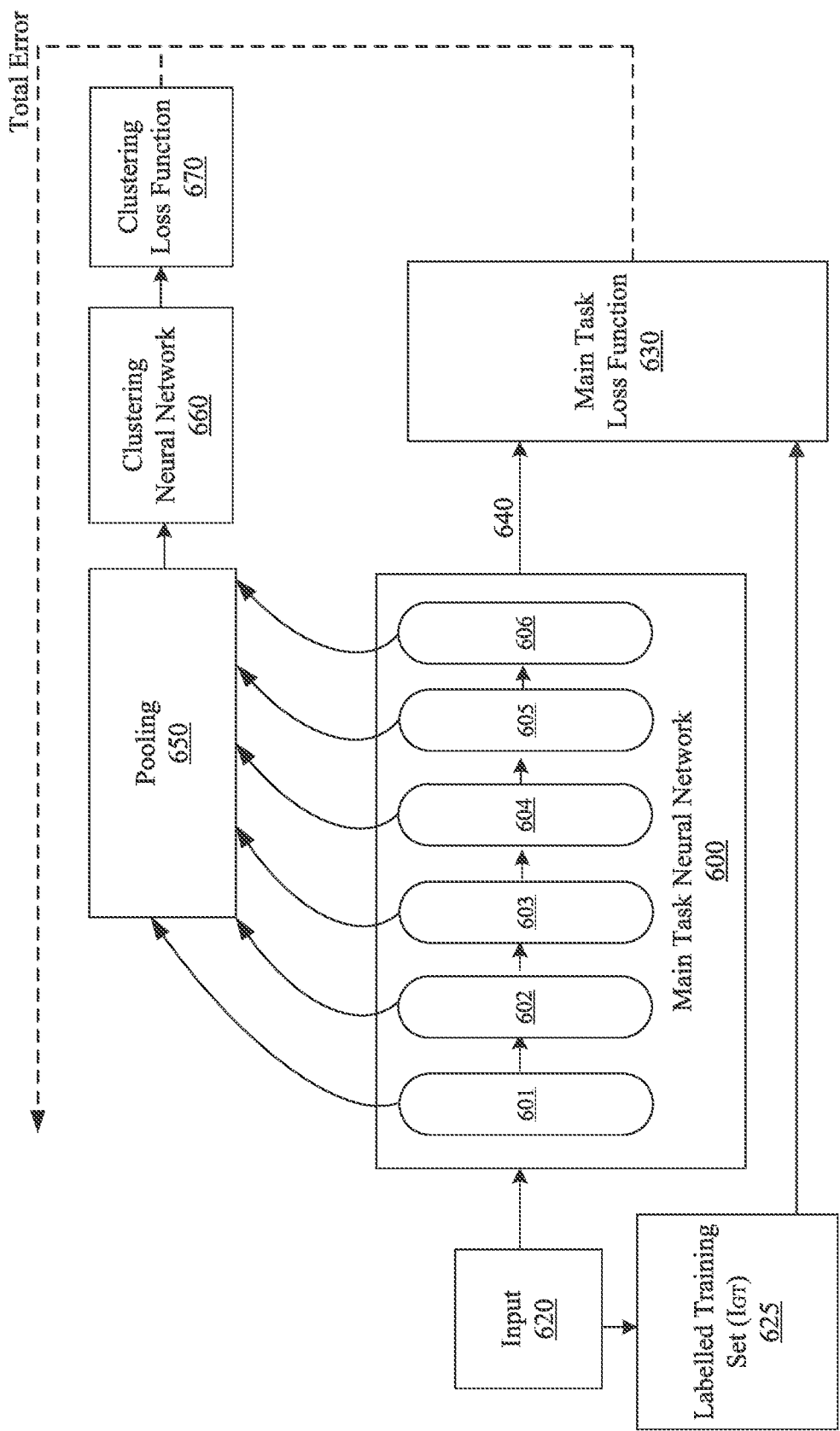
FIG. 6 is a block diagram of an example of training a main task neural network and clustering neural network in accordance with some implementations.

FIG. 6 is a block diagram of an example of training a main task neural network and clustering neural network in accordance with some implementations. Such training can be, but is not necessarily, performed as part of a semi-supervised training process illustrated in FIGS. 3-5. FIG. 6 illustrates a neural network training process that results in a main task neural network 600 being trained to produce an output 640 corresponding to a main task such as pose estimation performed by the pose estimator 20 of FIG. 1. Main tasks can include, but are not limited to, human pose estimation, hand tracking, body tracking, gaze tracking, semantic segmentation, and other applications in which a main task has multiple associated parts.

In various implementations, the neural network 600 has one or more layers 601, 602, 603, 604, 605, 606, for example, including an input layer, one or more hidden (or inner) layers, and an output layer. While FIG. 6 illustrates six layers, it will be understood that the neural network 600 can be configured with any number of layers. Each layer comprises one or more nodes. Training the neural network 600 can involve adjusting values for weights that specify the relationships between the nodes or otherwise connect the nodes of the one or more layers 601, 602, 603, 604, 605, 606. Weights can include weights between the input layer and a hidden layer, weights between more than one hidden layer, and weights between the last hidden layer and the output layer.

A small number of first example inputs or first training inputs 620 are manually labeled for the identified neural network main task to become labeled training set 625 (e.g., ground truth labeled input ($I_{GT}$)). A main task loss function 630 (e.g., error function or other quality assurance metric) is determined for the identified neural network main task. The main task loss function 630 is used during training to ensure the main task neural network 600 learns to accurately perform the main task, e.g., by determining a loss based on how much the output 640 of the main task neural network 600 differs from the labelled training set (e.g., main task ground truth data).

The implementation illustrated in FIG. 6 also uses clustering as a constraint to further improve the efficacy and accuracy of the training. Specifically, the clustering involves information pooled from some or all of layers 601, 602, 603, 604, 605, 606 by pooling feature 650. This pooled layer information is inputted into clustering neural network 660 and used to produce an output that is evaluated by a defined clustering loss function 670. The clustering neural network 660 and clustering loss function 670 are configured so that the clustering neural network 660 will learn to create/identify clusters (e.g., groups of the features of layers 601, 602, 603, 604, 605, 606) associated with similar features of respective parts of the main task. For example, where the main task is human pose estimation, the feature maps corresponding to left arm parts are expected to have similarities to one another. The clustering network 660 is configured to learn one or more clusters of layer features that correspond to the left arm part.

The clustering loss function 670 can be a k-means clustering, a hierarchical clustering loss, or any other type of loss evaluation technique designed to cause the clustering loss network 660 to learn to create/identify clusters associated with similar features of the main task. The clustering loss function 670 can be based on a predetermined number (e.g., k) of parts associated with the main task. For example, if a human pose estimation task involves 22 skeletal parts, the clustering loss function 670 can be defined using that number so that the clustering neural network 660 learns to identify that defined number of clusters.

Figure 7:
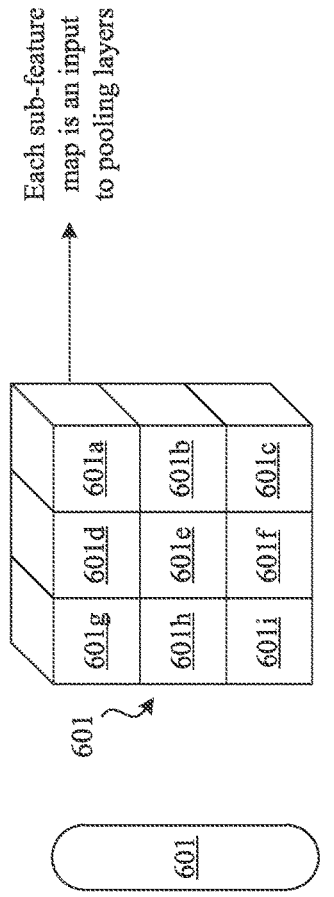
FIG. 7 is a block diagram of an example layer in a main task neural network in accordance with some implementations.

An objective of using the clustering is to improve the features learned by the main task neural network 600. The clustering loss of the clustering loss function 670 helps achieve this as the gradients from the clustering neural network 660 can be back-propagated to the main task neural network 600. FIG. 7 is a block diagram of an example layer in a main task neural network in accordance with some implementations.

Figure 8:
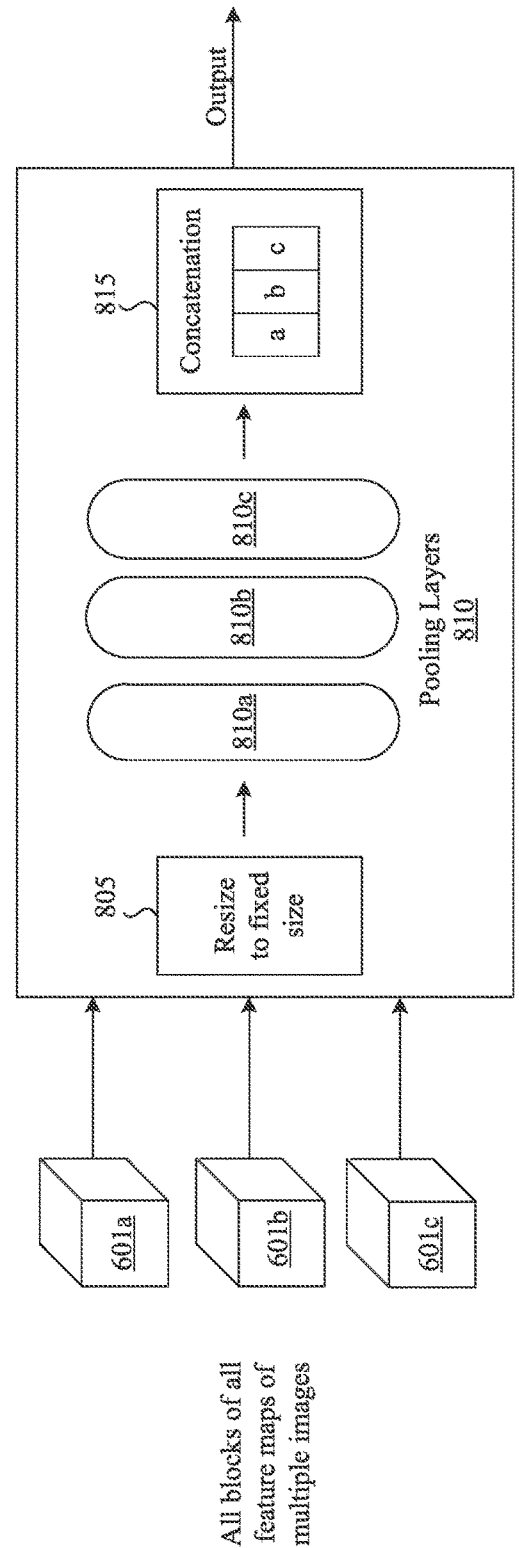
FIG. 8 is a block diagram of an example of using feature maps of multiple images in accordance with some implementations.
Figure 9:
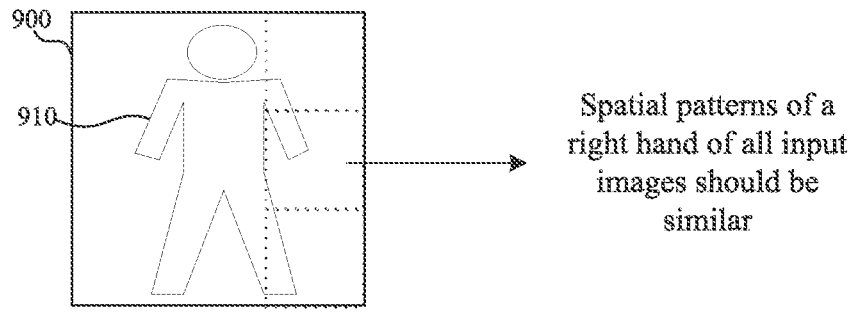
FIG. 9 is a block diagram illustrating how sub-feature blocks can correspond to human parts in accordance with some implementations.

FIGS. 7-9 illustrate an exemplary pooling/clustering technique. For each of the layers 601-606 of the main task neural network 600, the pooling/clustering technique may involve extracting sub-parts spatially that will be clustered. FIG. 7 is a block diagram depicting a side view and a front view of an example layer 601 in the main task neural network 600. In this example, the layer 601 includes sub-feature maps 601a-g corresponding to such sub-parts. Each of the other layers 602-606 of the main task neural network 600 may have its own sub-feature maps.

Note that it may be desirable to have a large number of images input together in one run of the network (e.g., a batch size of more than 1). It may be desirable to have multiple feature maps corresponding to multiple images for pooling/clustering since pooling/clustering using a single object (e.g., using a single image of a single person or single task sample) may be less effective than using a larger batch size. In some pose estimation implementations, multiple people are present in some or all of the images to improve the effectiveness of the pooling/clustering.

Each of the sub-feature maps (e.g., sub feature maps 601a-g) of FIG. 7 is input to the pooling layers of a neural network. FIG. 8 is a block diagram of an example of using feature maps of multiple images, for example, in a pooling process performed at pooling 650 of FIG. 6. In this example, all blocks of the feature maps (e.g., sub-feature maps 601a-g, etc.) are first resized at element 805, pooled in pooling layers 810a-c, and then concatenated together at concatenation element 815 and before going through the clustering network 660 for clustering.

Sub-parts (e.g., sub-feature maps 601a-g, etc.) of layers (e.g., layers 601-606) should have similar patterns when similar body parts are encountered in images. FIG. 9 is a block diagram illustrating how sub-feature blocks can correspond to human parts (e.g., the right arm) of a human 910 depicted in an image 900.

In addition, note that this algorithm may work on all feature maps (e.g., sub feature maps 601a-g) from all layers (e.g., from layers 601-606). The scale of the feature maps may decrease from layer 601 to layer 606. These different scales may be beneficial since it means humans, objects, and other tasks may be represented at different scales. Thus, if in some cases humans appear larger or smaller, that scale should be incorporated. A 3×3 grid of fixed-size blocks may defined for layer 601, as illustrated in FIG. 7. The scale of layer 604 may be half the size of layer 601, so only a 2×2 grid of sub-feature maps may be able to fit. Such sub-feature maps will cover larger portions of image. Thus, if the arm is much bigger that 1 cube in a feature map of FIG. 7, the 604 feature map should provide a larger feature map that can correspond to the bigger arm. This may make the learning even more robust to the scale of human present in the image. Humans close to a camera will appear larger and farther from camera will appear smaller.

Returning to FIG. 6, training the clustering neural network 660 together with the main task neural network 600 (e.g., using a total error based on both the clustering loss function 670 and the main task loss function 630) can ensure that the clustering neural network 660 learns the specified number of parts (e.g., k) of the main task and that the clusters will correspond to the parts associated with the main task. Moreover, training the networks together can also improve the accuracy of the main task neural network 600 because the individual parts of the main task are individually and more accurately identified.

In general a combined network that includes both the main task neural network 600 and the clustering neural network 660 may be trained more efficiently and more accurately than the main task neural network 600 by itself. The networks are trained together to effectively identify groups of features that correspond to main task parts and ensure that all features for those parts will be very similar to one another. Including the clustering neural network 660 adds a clustering constraint upon the combined network. The clustering effectively detects repeating patterns (e.g., of features represented in layers 601, 602, 603, 604, 605, 606) corresponding to particular parts (e.g., one or more specific patterns for a left arm part, one or more specific patterns for a right arm, etc.) based on learning from the repeating of similar patterns over the different inputs 620. Training the main task network 600 as part of the same training process effectively guides the clustering neural network 660 to identify those repeating patterns for parts associated with the main task.

Training a combined neural network that includes both the main task neural network 600 and the clustering neural network 660 can account for losses determined by both the main task loss function 630 and the clustering loss function 670. The training can result in modifying weights associating nodes of the layers in each of the networks 600, 660 to minimize the total error reflected in the two losses. In various implementations, gradient descent is used for the training and can include full batch training, stochastic training or mini-batch training.

Figure 10:
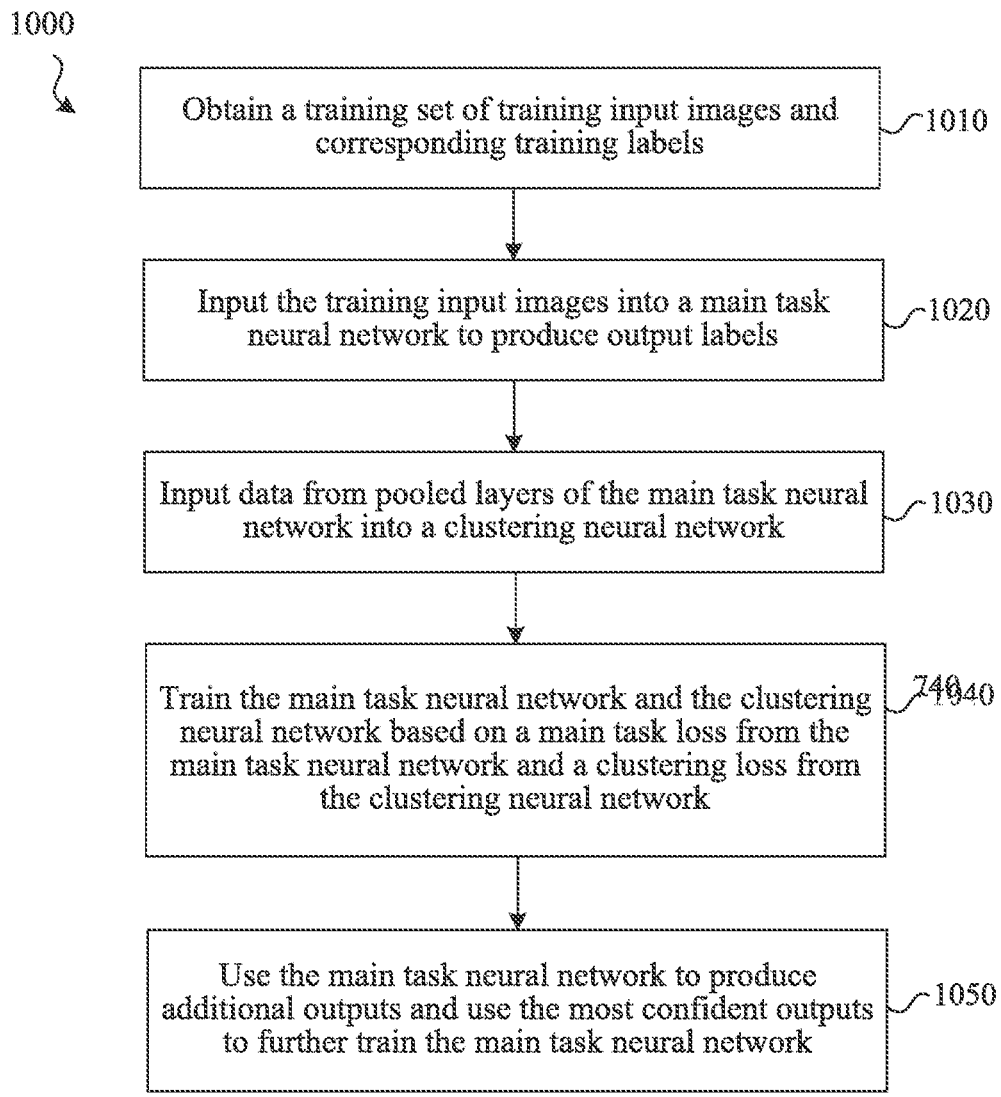
FIG. 10 is a flowchart representation of a method of training a neural network in accordance with some implementations.

FIG. 10 is a flowchart representation of a method 1000 of training a neural network in accordance with some implementations. In various implementations, example method 1000 is performed by processing logic, including hardware, firmware, software, or a combination thereof. In some implementations, example method 1000 is performed by a processor executing code stored in a non-transitory computer-readable medium (e.g., a memory). In some implementations, example method 1000 is performed on a portable electronic device (e.g., laptop, tablet, smartphone, head-mounted display (HMD)).

At block 1010, the method 1000 involves obtaining a training set of training inputs and corresponding training labels. The training labels identify known locations of parts of objects in the training inputs. For example, the training labels may correspond to images of humans labelled with human poses, images of houses labelled with windows and doors, audio samples labelled with phrase labels, documents or other text-based content labelled with phrase labels, etc. The set of training inputs may have been created by a manual labelling process or an automatic labelling process so long as the labels can generally be considered to represent the ground truth labels for the training inputs.

At block 1020, the method 1000 involves inputting the training inputs into a main task neural network to produce output labels. The output labels predict locations of the parts of the objects in the training inputs. For example, if the main task includes human pose estimation, the main task output may include providing a skeleton or collection of bounding boxes that represent the position, orientation, or other attributes of the pose of a human depicted in each input image.

At block 1030, the method 1000 involves inputting data from pooled layers of the main task neural network into a clustering neural network. At block 1040, the method 1000 involves training the main task neural network and the clustering neural network based on a main task loss from the main task neural network and a clustering loss from the clustering neural network. In some implementations, the main task loss is determined by comparing the output labels and the training labels. In some implementations, the main task loss is determined using learned quality assurance metrics.

In some implementations, the clustering loss is configured to cause the clustering network to learn to label the parts of the objects individually. The clustering loss can be configured to cause the clustering network to learn groups corresponding to the parts of the objects. For example, the clustering neural network can be trained to identify a first group of the sub-features in the layers corresponding to a first pattern and a second group of sub-features in the layers corresponding to a second pattern. The number of groups learned by the clustering neural network corresponds to a number of the parts of each of the objects.

The main task neural network and the clustering neural network can be trained together using the main task loss and the clustering loss to cause the groups learned by the clustering neural network to correspond to the parts and to cause similarity between sub-parts in feature maps across multiple images.

At block 1050, the method 1000 involves using the main task neural network to produce additional outputs and using the most confident outputs to further train the main task neural network. In one implementation, this involves inputting additional inputs into the main task neural network to produce additional output labels and corresponding confidence values to be used to provide an automatically-labelled training set of data. This automatically-labeled training set of data is a subset of the additional inputs and a corresponding subset of the additional output labels that can be selected based on the confidence values or other such criteria. The main task neural network is then trained using the automatically-labeled training set of data. During this subsequent training, the clustering neural network may also be used as described above with respect to block 1040. Once trained using method 1000, the main task neural network can be used to perform the main task without the use of the clustering neural network.

There may be various advantages to training the entire network in one process. For example, if the task is body pose estimation, the main task should ideally be able to learn good features given a lot of images. However, given a very small initial training set, it is not be possible to learn that. To improve the features (e.g., represented in the sub-parts of the layers 601-606 in the main task neural network 600 in FIG. 6), the additional constraint is added for the clustering loss. This clusters sub-parts of each layer to make the features better. Both of the losses help each other. The main task loss ensures that the clustering network 660 does not just learn any random clusters because if it learns any random clusters and not the clusters corresponding to body parts, the main task loss would be very high. Moreover, minimizing the main task loss ensure that the clusters learnt are meaningful (e.g., in the pose estimation use case, clusters corresponding to each body part). The clustering network 660 in turn makes the features (e.g., represented in the sub-parts of the layers 601-606 in the main task neural network 600 in FIG. 6) better by enforcing that sub-parts of feature maps corresponding to same parts of the body in different images should be similar.

The main task neural network can be integrated into an application stored on a non-transitory computer-readable medium. Such an application can be executed on a computing device to produce desired outputs for one or more inputs. In one example, a user executes the application on the user's personal computing device (e.g., desktop, laptop, mobile device, etc.), provides an input to the application on the device, and views or otherwise experiences the output on the device. For example, the user may input an unlabeled image of a human and view an output that depicts a pose of the human on the image, e.g., depicting a skeleton overlaid on the image. In another example, the application is executed on a server or other remote device and is accessed by one or more users remotely.

FIG. 11 is a block diagram of an example system architecture of an exemplary device configured to train and store a neural network in accordance with one or more implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1100 includes one or more processing units 1102 (e.g., microprocessors, ASICs, FPGAs, GPUs, CPUs, processing cores, or the like), one or more input/output (I/O) devices 1106, one or more communication interfaces 1108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 1110, a memory 1120, and one or more communication buses 1104 for interconnecting these and various other components.

In some implementations, the one or more communication buses 1104 include circuitry that interconnects and controls communications between system components. In some implementations, the one or more I/O devices 1106 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more image sensors, one or more microphones, one or more speakers, a haptics engine, one or more depth sensors (e.g., a structured light, a time-of-flight, or the like), one or more displays, or the like.

In some implementations, the one or more displays correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays correspond to diffractive, reflective, polarized, holographic, etc. waveguide displays. In one example, the device 1100 includes a single display or no display.

The memory 1120 includes high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 comprises a non-transitory computer readable storage medium. In some implementations, the memory 1120 or the non-transitory computer readable storage medium of the memory 1120 stores the following programs, modules and data structures, or a subset thereof including an optional operating system 1130 and one or more modules 1140. The operating system 1130 includes procedures for handling various basic system services and for performing hardware dependent tasks. The neural network trainer 1142 is an example of a module that can be configured to train a neural network according to the techniques disclosed herein. The neural network 1144 represents a neural network that has been integrated into an application or otherwise trained and then stored in the memory 1120.

FIG. 11 is intended more as a functional description of the various features which are present in a particular implementation as opposed to a structural schematic of the implementations described herein. As recognized by those of ordinary skill in the art, items shown separately could be combined and some items could be separated. The actual number of units and the division of particular functions and how features are allocated among them will vary from one implementation to another and, in some implementations, depends in part on the particular combination of hardware, software, or firmware chosen for a particular implementation.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
at an electronic device with one or more processors:
obtaining a training set of training inputs and corresponding training labels, the training labels identifying known locations of parts of objects in the training inputs;
inputting the training inputs into a main task neural network to produce output labels predicting locations of the parts of the objects in the training inputs;
inputting data from pooled layers of the main task neural network into a clustering neural network to identify clusters comprising a first group of features in a first subset of the pooled layers that correspond with a first part of at least one object of the objects and a second group of features in a second subset of the pooled layers that correspond with a second part of the at least one object of the objects, wherein the first subset is different than the second subset of pooled; and
training the main task neural network and the clustering neural network based on a main task loss from the main task neural network and a clustering loss from the clustering neural network.

2. The method of claim 1 further comprising:
inputting additional inputs into the main task neural network to produce additional output labels and corresponding confidence values;
selecting, based on the confidence values, an automatically-labeled training set of data comprising a subset of the additional inputs and a corresponding subset of the additional output labels; and
further training the main task neural network and the clustering neural network using the automatically-labeled training set of data.

3. The method of claim 1 further comprising determining the main task loss by comparing the output labels and the training labels.

4. The method of claim 1 further comprising determining the main task loss using learned quality assurance metrics.

5. The method of claim 1 wherein the clustering loss is configured to cause the clustering neural network to learn to label the parts of the objects individually.

6. The method of claim 1, wherein the clustering loss is configured to cause the clustering neural network to learn groups corresponding to the parts of the objects.

7. The method of claim 1, wherein the clustering neural network is trained to identify a first group of the pooled layers corresponding to a first pattern and a second group of the pooled layers corresponding to a second pattern.

8. The method of claim 1, wherein the main task neural network and the clustering neural network are trained together using the main task loss and the clustering loss to cause clusters learnt by the clustering neural network to correspond to the parts of the objects.

9. The method of claim 1, wherein the main task neural network and the clustering neural network are trained together using the main task loss and the clustering loss to cause similarity between sub-parts of feature maps across multiple images.

10. The method of claim 1, wherein groups learned by the clustering neural network correspond to human body parts.

11. The method of claim 1, wherein a number of groups learned by the clustering neural network corresponds to a number of the parts of the objects.

12. The method of claim 1, wherein the main task neural network is trained for human pose estimation, wherein the parts of the objects correspond to parts of a skeleton representing human pose.

13. The method of claim 1, wherein the main task neural network is trained for hand tracking, body tracking, or gaze tracking.

14. The method of claim 1, wherein the main task neural network is trained for semantic segmentation of audio.

15. The method of claim 1, wherein the main task neural network is trained for semantic segmentation of text.

16. The method of claim 1 further comprising integrating the main task neural network into an application stored on a non-transitory computer-readable medium.

17. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining a training set of training inputs and corresponding training labels, the training labels identifying known locations of parts of objects in the training inputs;
inputting the training inputs into a main task neural network to produce output labels predicting locations of the parts of the objects in the training inputs;
inputting data from pooled layers of the main task neural network into a clustering neural network to identify clusters comprising a first group of features in a first subset of the pooled layers that correspond with a first part of at least one object of the objects and a second group of features in a second subset of the pooled layers that correspond with a second part of the at least one object of the objects, wherein the first subset is different than the second subset; and
training the main task neural network and the clustering neural network based on a main task loss from the main task neural network and a clustering loss from the clustering neural network.

18. The system of claim 17, wherein the operations further comprise:
inputting additional inputs into the main task neural network to produce additional output labels and corresponding confidence values;
selecting, based on the confidence values, an automatically-labeled training set of data comprising a subset of the additional inputs and a corresponding subset of the additional output labels; and
further training the main task neural network and the clustering neural network using the automatically-labeled training set of data.

19. The system of claim 17, wherein the operations further comprise determining the main task loss by comparing the output labels and the training labels.

20. A non-transitory computer-readable storage medium, storing program instructions computer-executable on a computer to perform operations comprising:
- obtaining a training set of training inputs and corresponding training labels, the training labels identifying known locations of parts of objects in the training inputs;
- inputting the training inputs into a main task neural network to produce output labels predicting locations of the parts of the objects in the training inputs;
- inputting data from pooled layers of the main task neural network into a clustering neural network to identify clusters comprising a first group of features in a first subset of the pooled layers that correspond with a first part of at least one object of the objects and a second group of features in a second subset of the pooled layers that correspond with a second part of the at least one object of the objects, wherein the first subset is different than the second subset; and
- training the main task neural network and the clustering neural network based on a main task loss from the main task neural network and a clustering loss from the clustering neural network.

* * * * *